(12) United States Patent
Hayashi et al.

(10) Patent No.: US 7,922,157 B2
(45) Date of Patent: Apr. 12, 2011

(54) STOPPER FOR CYLINDRICAL ELASTIC MOUNT AND CYLINDRICAL ELASTIC MOUNT ASSEMBLY

(75) Inventors: Takashi Hayashi, Findlay, OH (US); Kunio Sasaki, Kani-Gun (JP)

(73) Assignee: Tokai Rubber Industries, Ltd., Komaki-Shi (JP)

( * ) Notice: Subject to any disclaimer, the term of this patent is extended or adjusted under 35 U.S.C. 154(b) by 868 days.

(21) Appl. No.: 11/860,641

(22) Filed: Sep. 25, 2007

(65) Prior Publication Data
US 2008/0079205 A1     Apr. 3, 2008

(30) Foreign Application Priority Data
Sep. 29, 2006  (JP) .................................. 2006-267369

(51) Int. Cl.
*F16M 13/00* (2006.01)
(52) U.S. Cl. ................ 267/141.2; 267/140.12; 267/293; 296/109.07; 296/35.1
(58) Field of Classification Search .......... 267/292–294, 267/141.1–141.3, 140.1, 140.11–140.13; 248/636, 638; 296/190.07, 35.1; 180/300
See application file for complete search history.

(56) References Cited

U.S. PATENT DOCUMENTS

| | | | | |
|---|---|---|---|---|
| 5,595,373 A | * | 1/1997 | Ikeda | 267/140.12 |
| 5,743,509 A | * | 4/1998 | Kanda et al. | 248/635 |
| 5,899,431 A | * | 5/1999 | Lefol | 267/219 |
| 6,216,833 B1 | * | 4/2001 | Lefferts et al. | 188/380 |
| 6,419,213 B2 | * | 7/2002 | Murai | 267/140.12 |
| 6,659,435 B2 | * | 12/2003 | Yamaguchi et al. | 267/140.12 |
| 6,705,600 B2 | * | 3/2004 | Yamaguchi et al. | 267/140.11 |
| 2003/0218287 A1 | * | 11/2003 | Mikami et al. | 267/293 |
| 2007/0235912 A1 | * | 10/2007 | Sato et al. | 267/140.13 |

FOREIGN PATENT DOCUMENTS

| | | |
|---|---|---|
| JP | 06-129461 A1 | 5/1994 |
| JP | 11-311281 A1 | 11/1999 |
| JP | 2001-012548 A1 | 1/2001 |
| JP | 2001-280386 A1 | 10/2001 |
| JP | 2002-021931 A1 | 1/2002 |
| JP | 2002-317843 A1 | 10/2002 |
| JP | 2003-021194 A1 | 1/2003 |
| JP | 2004-003540 A1 | 1/2004 |
| JP | 2004-028250 A1 | 1/2004 |
| JP | 2004-316798 A1 | 11/2004 |

* cited by examiner

*Primary Examiner* — Robert A Siconolfi
*Assistant Examiner* — Anna Momper
(74) *Attorney, Agent, or Firm* — Burr & Brown (57) ABSTRACT

A stopper for a cylindrical elastic mount includes a concave portion which is formed at each of a plurality of locations on a circumference of a cylindrical portion of a stopper fitting, the concave portion being concaved in a radially inward direction to partially enlarge a width of an outward flange so as to provide a large width portion on an enlarged width portion of the outward flange of a first rubber portion. The stopper further includes a plurality of second rubber portions each of which is fixedly disposed only between adjacent concave portions in a circumferential direction of a bottom portion and protruding higher than the first rubber portion. The first and each of the plurality of the second rubber portions are separated by a groove-shaped gap that is provided so as to continuously extend around each of the plurality of second rubber portions.

11 Claims, 6 Drawing Sheets

STOPPER FOR CYLINDRICAL ELASTIC MOUNT AND CYLINDRICAL ELASTIC MOUNT ASSEMBLY

The present application is based on Japanese Patent Application No. 2006-267369 filed on Sep. 29, 2006, the contents of which are incorporated herein by reference.

BACKGROUND OF THE INVENTION

1. Field of the Invention

The present invention relates to a stopper for a cylindrical elastic mount and a cylindrical elastic mount assembly, in particular to a stopper for cylindrical elastic mount that is suitably used as a discrete stopper assembled to a cylindrical elastic mount such as a differential mount, a member mount or a body mount for an automobile, as well as a cylindrical elastic mount constructed by assembling such stopper.

2. Discussion of Related Art

As a type of an elastic mount interposed between two members to connect these two members, a first member and a second member constituting a vibration transmission system, there is known a cylindrical elastic mount which includes a predetermined shaft member, an outer cylindrical member disposed radially outwardly of the shaft member with a distance therebetween and a main elastic rubber body interposed therebetween for elastic connection. In the cylindrical elastic mount structured as above, generally, the shaft member is fixed to the first member by a fixing bolt inserted into an inner hole of the shaft member, and the outer cylindrical member is fixed to the second member by press-fitting in an attachment hole formed therein. When a vibration load (vibration) is applied in an axial direction or perpendicular to an axial direction between the shaft member and the outer cylindrical member, the main elastic rubber body is elastically deformed to absorb the vibration. Thus, the cylindrical elastic mount is suitably used as a differential mount, a member mount, a body mount or the like for a vehicle such as an automobile.

Meanwhile, many of cylindrical elastic mounts structured as above include a stopper means for limiting an amount of an axial relative displacement between the shaft member and the outer cylindrical member to prevent an excessive deformation of the main elastic rubber body when a large vibration load is axially applied. Such stopper means is provided to achieve an improvement in durability of the main elastic rubber body or other purposes. In addition, as a kind of the conventional stopper means, a stopper for a cylindrical elastic mount has been suitably used as shown in FIG. 4 of JP-A-2004-28250. The stopper for a cylindrical elastic mount is a discrete stopper, which is a distinct member from the cylindrical elastic mount and is assembled to a first axial end of the cylindrical elastic mount.

The discrete stopper includes a stopper fitting fixed to a first axial end of a shaft member by a fixing bolt in a state of being opposed to a second member and an outer cylindrical member, and a rubber portion fixedly disposed on a surface where the stopper fitting is opposed to those members. When the shaft member and the outer cylindrical member are subjected to excessive relative displacement toward their first axial ends, the second member or the outer cylindrical member are brought into abutting contact with the stopper fitting via the rubber portion, whereby the axial relative displacement toward the first axial ends of the shaft member and the outer cylindrical member can be elastically limited. An axial relative displacement toward second axial ends of the shaft member and the outer cylindrical member is generally limited by abutting an outer flange, which is disposed along a periphery of an end of the outer cylindrical member located on a second axial end side of the cylindrical elastic mount, against the first member via a rubber stopper formed integrally with the main elastic rubber body.

Additionally, as shown in FIGS. 3 and 6 of JP-A-2004-28250, there is also known a discrete stopper having two rubber portions disposed on a stopper fitting, in which a first rubber portion has a height lower than a second rubber portion, and the second rubber portion has a tip located closer to the second member and the outer cylindrical member than a tip of the first rubber portion.

The known discrete stopper, in a state of being assembled to a cylindrical elastic mount, is capable of exhibiting a stopper function for limiting the amount of relative displacement toward the first axial end side of the shaft member and the outer cylindrical member via the first rubber portion having the lower height. Then, the second rubber portion, which is in a state of being in contact with the second member and the outer cylindrical member, is subjected to elastic compressive deformation so as to allow the axial relative displacement between the shaft member and the outer cylindrical member until the members abut on the first rubber portion. Thereby, in cooperation with shearing deformation of the main elastic rubber body, there is exhibited a vibration damping function to absorb a vibration load applied axially between the shaft member and the outer cylindrical member.

Particularly in the discrete stopper shown in FIG. 6 of JP-A-2004-28250, the stopper fitting has a cylindrical shape having a bottom portion on one side thereof and opening toward the second member side. Additionally, the stopper fitting includes an outward flange that is integrally formed along a periphery of an opening-side end of the cylindrical portion. In the above discrete stopper, the first rubber portion is fixedly disposed on the outward flange of the stopper fitting, and the second rubber portion is fixedly disposed on the bottom portion thereof. The cylindrical portion connecting the outward flange and the bottom portion is disposed radially outwardly of the shaft member of the cylindrical elastic mount with a radial distance therebetween. The bottom portion is supported by the shaft member at its center. With the first and the second rubber portions are opposite to or in contact with the second member, the discrete stopper is assembled to the first axial end of the cylindrical elastic mount.

Consequently, the discrete stopper structured as above is different from the known discrete stopper in which the first and the second rubber portions are fixedly disposed on a one-side surface of the stopper fitting made of a flat plate, as shown in FIG. 3 of JP-A-2004-28250. The discrete stopper shown in FIG. 6 of the patent publication document allows an increase in the height of the second rubber portion without changing a distance between the second member or the outer cylindrical member and the first rubber portion. This can reduce a spring constant of the second rubber portion subjected to a compressive deformation, that is, the vibration damping performance can be improved without changing a limit position of the axial relative displacement toward the first axial end sides of the shaft member and the outer cylindrical member limited by contacting those members with the first rubber portion.

The inventors of the present invention have made an extensive study on the discrete stopper constructed as described above, and have found that the known discrete stopper has internal problems as below.

Specifically, in the known discrete stopper having the first and the second rubber portions, for ensuring a sufficient durability of the first rubber portion, it is desirable to provide a largest possible area for contacting the first rubber portion with the second member and the outer cylindrical member. In addition, it is preferable that the second rubber portion also has sufficient height and thickness for reducing a spring constant so as to improve vibration damping performance thereof without sacrificing durability.

However, in the known discrete stopper, the first and the second rubber portions are disposed on the outward flange and the bottom portion such that they are located on an outer and inner side of the stopper fitting in the radial direction, respectively. In this case, the stopper fitting is supported at its center by the shaft member of the cylindrical elastic mount. Accordingly, in the stopper fitting, a limited narrow area is provided as a space for forming the outward flange and the bottom portion where the first and the second rubber portions are fixedly disposed. Thus, in the limited narrow area of such a stopper fitting, it has been difficult to dispose together both of the first rubber portion having the largest possible area for contacting with the second member, and the outer cylindrical member and the second rubber portion having the sufficiently large height and thickness. Therefore, in the known discrete stopper, namely, in the above stopper for a cylindrical elastic mount, it has been extremely difficult to simultaneously ensure sufficient durability and high vibration damping performance or vibration damping characteristics.

SUMMARY OF THE INVENTION

The present invention has been made in the light of the situation described above. It is therefore an object of the invention to provide a stopper for a cylindrical elastic mount having an improved structure which ensures sufficient durability and high vibration damping performance or characteristics simultaneously, in which the stopper is assembled to a first axial end of a cylindrical elastic mount to exhibit a stopper function for limiting an amount of an axial relative displacement between a shaft member and an outer cylindrical member in the cylindrical elastic mount and a vibration damping function for absorbing vibration applied axially between those members. In addition, it is another object of the invention to provide a cylindrical elastic mount assembly constructed by assembling the stopper for a cylindrical elastic mount having the foregoing improved structure.

The above object may be achieved according to a first aspect of the present invention, which provides a stopper for a cylindrical elastic mount assembled to a first axial end of the cylindrical elastic mount including a shaft member fixed to a first member, an outer cylindrical member that is fixed to a second member connected to the first member in a vibration damping fashion and that is disposed radially outwardly of the shaft member with a predetermined radial distance therebetween, and a main elastic rubber body interposed between the shaft member and the outer cylindrical member for elastic connection therebetween, the stopper comprising: a stopper fitting with a cylindrical shape having a bottom on one side thereof and opening toward a second axial end of the cylindrical elastic mount in the state of being assembled thereto, the stopper fitting having a cylindrical portion disposed radially outwardly of the shaft member with a predetermined radial distance therebetween; an outward flange formed integrally along a periphery of an opening-side end of the cylindrical portion; and a bottom portion supported by the shaft member; a first rubber portion fixedly disposed on the outward flange of the stopper fitting and protruding toward the opening of the cylindrical portion of the stopper fitting, the first rubber portion being brought into contact with the outer cylindrical member or the second member to which the outer cylindrical member is fixed, so as to limit an amount of an axial relative displacement between the outer cylindrical member and the shaft member; and a plurality of second portions fixedly disposed on the bottom portion of the stopper fitting and protruding higher than the first rubber portion toward the opening of the cylindrical portion, each of the plurality of second portions being elastically deformed so as to allow the axial relative displacement between the outer cylindrical member and the shaft member until the outer cylindrical member or the second member is abutted against the first rubber portion in a state where each of the plurality of second portions is in contact with the outer cylindrical member or the second member, wherein a concave portion is formed at each of a plurality of locations on a circumference of the cylindrical portion of the stopper fitting, the concave portion being concaved in a radially inward direction to partially enlarge a width of the outward flange so as to provide a large width portion on the enlarged width portion of the outward flange of the first rubber portion, while each of the plurality of second portions is fixedly disposed only between adjacent concave portions in a circumferential direction of the bottom portion, and wherein a groove-shaped gap for separating the first and each of the plurality of second portions is provided so as to continuously extend around each of the plurality of second portions.

In a preferred form of the stopper for a cylindrical elastic mount according to the first aspect of the invention, the large width portion of the first rubber portion and each of the plurality of second portions are fixedly disposed on the stopper fitting so as to be adjacent to each other in a circumferential direction and arranged alternately.

In another preferred form of the stopper for a cylindrical elastic mount according to the first aspect of the invention, each of the plurality of second portions is in the form of a projection whose cross-sectional area gradually decreases toward a tip thereof.

In another preferred form of the stopper for a cylindrical elastic mount according to the first aspect of the invention, each of the plurality of second portions comprises an outer side surface and an inner side surface that are positioned opposite to each other on an outer circumferential side and an inner circumferential side, respectively, of the bottom portion of the stopper fitting, the outer and inner side surfaces being formed of inclined surfaces inclining so as to be closer to each other as it approaches the tip of each of the plurality of second portions, and the inner side surface having a longer length and more gradual inclination than that of the outer side surface.

In another preferred form of the stopper for a cylindrical elastic mount according to the first aspect of the invention, the first and each of the plurality of second portions are fixedly and integrally disposed on the stopper fitting.

Further, in another preferred form of the stopper for a cylindrical elastic mount according to the present invention, the groove-shaped gap comprises a recessed portion extending with a predetermined depth between the first and each of the plurality of second portions in a height direction thereof, the recessed portion having a bottom surface located on a side of the bottom portion of the stopper fitting, rather than on a side of an opposite side of a surface where the first rubber portion is formed on the outward flange of the stopper fitting.

Furthermore, in another preferred form of the stopper for a cylindrical elastic mount according to the first aspect of the invention, the stopper fitting has a through hole in the center of the bottom portion thereof, and a cylindrical mounting inner portion which extends toward the opening of the cylindrical portion and which is integrally provided uprightly along a periphery of an opening of the through hole, the cylindrical mounting inner portion is press-fitted into an inner hole formed in the shaft member of the cylindrical elastic mount, whereby the bottom portion of the stopper fitting is supported by the shaft member.

In addition, the object may be achieved according to a second aspect of the present invention, which provides a cylindrical elastic mount assembly constructed by assembling a stopper for cylindrical elastic mount to a first axial end of a cylindrical elastic mount including a shaft member fixed to a first member, an outer cylindrical member that is fixed to a second member connected to the first member in a vibration damping fashion and that is disposed radially outwardly of the shaft member with a predetermined radial space therebetween, and a main elastic rubber body interposed between the shaft member and the outer cylindrical member for elastic connection therebetween, wherein the stopper for cylindrical elastic mount is the stopper for cylindrical elastic mount according to any one of above forms.

Specifically, in the stopper for a cylindrical elastic mount according to the present invention, the concave portion is formed at each of the plurality of locations on the circumference of the cylindrical portion of the stopper fitting to provide the enlarged width portions on the outward flange. Thereby, of the first rubber portion formed on the outward flange, the portion thereof positioned on each of the enlarged width portions of the outward flange is made as the large width portion. In addition, since the second rubber portion is not disposed on the inner side of the portion where the large width portion is disposed, the large width portion of the first rubber portion has a more sufficiently large width.

Thus, the stopper according to the present invention differs from the known stopper in which the first rubber portion extends continuously with a constant width corresponding to a width of the outward flange along an entire periphery of the outward flange disposed continuously with a predetermined width in the circumferential direction on an outer circumferential portion of the stopper fitting. In the stopper according to the present invention, when the shaft member and the outer cylindrical member are subjected to excessive relative displacement toward the axial end side thereof, the first rubber portion is brought into abutting contact with the second member and the outer cylindrical member with a larger contact area, which is equivalent to the large width portion thereof. Thereby, when the first rubber portion contacts with the second member and the outer cylindrical member, an impact load applied to the first rubber portion from the second member and the outer cylindrical member is advantageously dispersed, which can effectively reduce compressive deformation occurring at the first rubber portion. As a result, the first rubber portion can have an advantageously improved durability.

In the stopper according to the present invention, in addition to the first rubber portion including the large width portion as described above, in the bottom portion of the stopper fitting, each of the plurality of second portions is formed only on the portion between the concave portions adjacent to each other in the circumferential direction, namely, only on the portion positioned between the large width portions adjacent to each other in the circumferential direction. Furthermore, the groove-shaped gap for separating the first and each of the plurality of second portions is disposed around each of the plurality of second portions.

Accordingly, the stopper according to the present invention differs from the known stopper in which the first rubber portion is formed so as to extend continuously with the constant width along the entire periphery of the outward flange disposed on the outer circumferential portion of the stopper fitting and the second rubber portion is formed inside the outward flange. The stopper according to the present invention can minimize a reduction in the area of the entire first rubber portion contacting with the second member and the outer cylindrical member, and simultaneously the height and thickness of each of the plurality of second portions can be sufficiently increased. Thereby, the spring constant of each of the plurality of second portions can be advantageously made small. Thus, when each of the plurality of second portions is subjected to compressive deformation while being in contact with the second member and the outer cylindrical member, its soft spring characteristics can be exhibited, and thus, the amount of the compressive deformation thereof can be effectively reduced. As a result, the durability of each of the plurality of second portions can be advantageously improved.

Therefore, in the state of being assembled to the cylindrical elastic mount, the stopper for a cylindrical elastic mount according to the present invention can stably and surely exhibit the stopper function for limiting the amount of axial relative displacement between the shaft member and the outer cylindrical member of the cylindrical elastic mount and the vibration damping function for absorbing a vibration applied axially between the shaft member and the outer cylindrical member, along with the good durability and the sufficiently high performance or characteristics.

In addition, the cylindrical elastic mount assembly according to the present invention is constructed by assembling the stopper for a cylindrical elastic mount having the foregoing excellent characteristics to the cylindrical elastic mount. Accordingly, the stopper for a cylindrical elastic mount assembly can advantageously obtain function and effects that are substantially the same as the remarkable function and effects exhibited by the stopper for a cylindrical elastic mount.

BRIEF DESCRIPTION OF THE DRAWINGS

The above and other objects, features, advantages and technical and industrial significance of the present invention will be better understood by reading the following detailed description of presently preferred embodiments of the invention, when considered in connection with the accompanying drawings, in which.

DETAILED DESCRIPTION OF THE PREFERRED EMBODIMENT

To further clarify the present invention, there will be described in detail embodiments of the invention with reference to the drawings.

Figure 1:
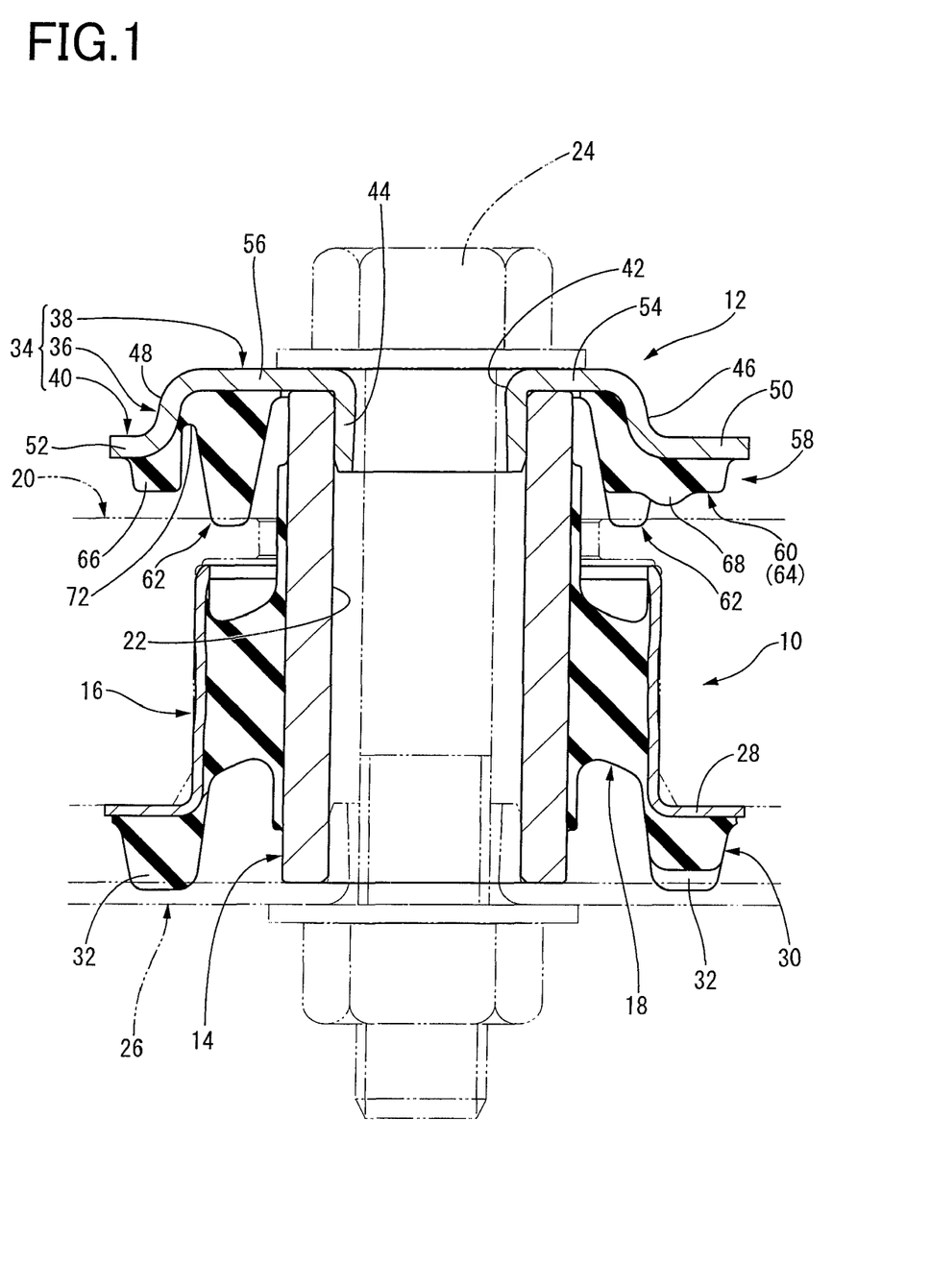
FIG. 1 is an elevational view in axial cross section showing a cylindrical elastic mount assembly according to one embodiment of the present invention.

Referring first to an axial cross section of FIG. 1, there is schematically shown a cylindrical elastic mount assembly connecting a vehicle differential carrier and a vehicle body in a vibration damping fashion which is constructed according to one embodiment of the present invention. As obvious in FIG. 1, the cylindrical elastic mount assembly according to the present embodiment includes a cylindrical elastic mount in the form of a differential mount 10 and a stopper for a cylindrical elastic mount in the form of a discrete stopper 12 assembled to the differential mount 10.

Figure 2:
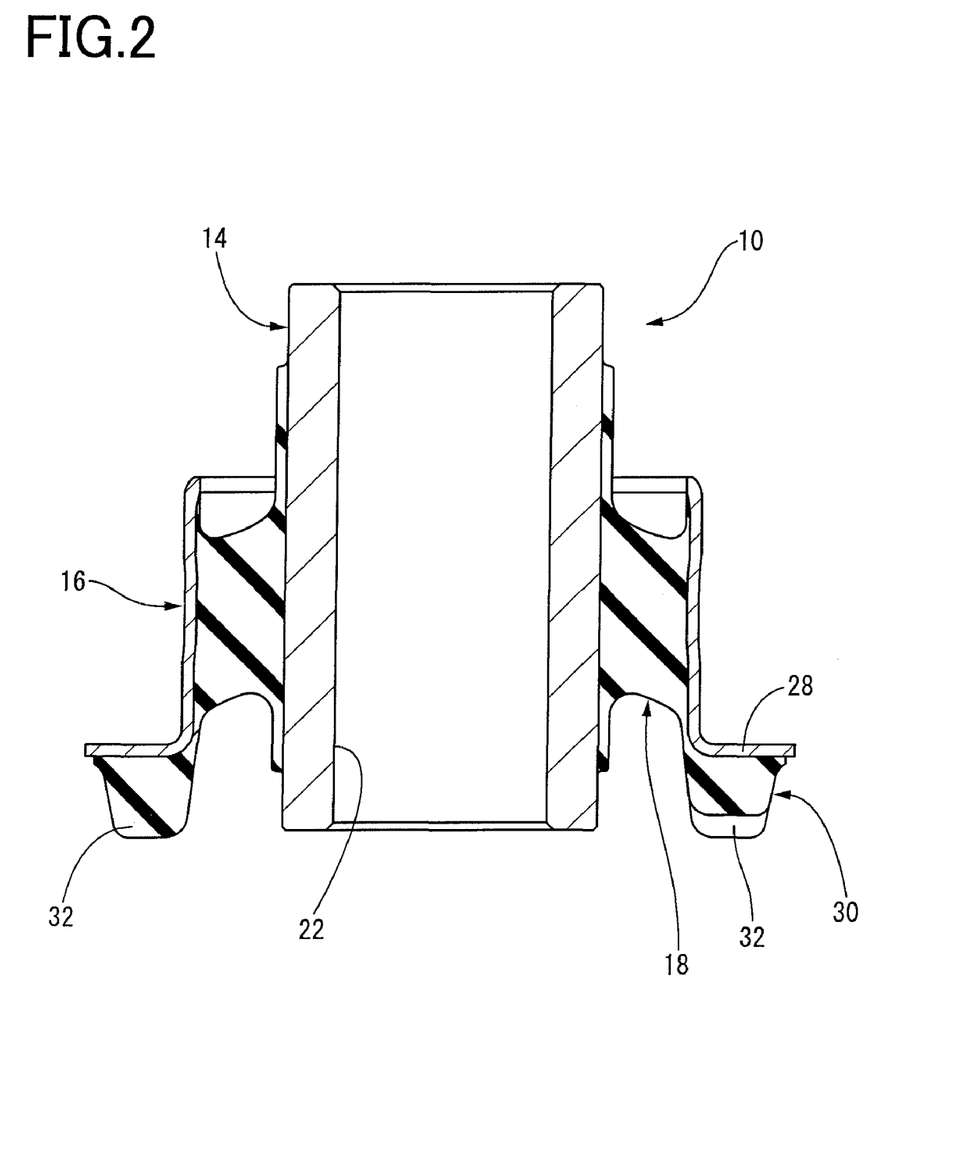
FIG. 2 is an elevational view in axial cross section showing a cylindrical elastic mount constituting the cylindrical elastic mount assembly shown in FIG. 1.

The differential mount 10 constituting the cylindrical elastic mount according to the present embodiment has a known structure, as obvious in each of FIGS. 1 and 2, in which a shaft member in the form of an inner sleeve 14 and an outer cylindrical member in the form of an outer sleeve 16 are spaced apart from each other with a radial predetermined distance therebetween. In addition, a main elastic rubber body 18 is interposed therebetween to elastically connect the inner sleeve 14 and the outer sleeve 16 each other.

As in the known structure, the outer sleeve 16 is fixedly press-fitted to a cylindrical fixing portion 20 (shown by a two-dot chain line in FIG. 1), which is a second member on the vehicle body side or the differential carrier side. In addition, the inner sleeve 14 is fixed to a mounting plate 26 (shown by a two-dot chain line in FIG. 1), which is a first member on the differential carrier side or the vehicle body side by a fixing bolt 24 (shown by a two-dot chain line in FIG. 1) inserted into an inner hole 22 of the inner sleeve 14 from a first axial end side thereof. The mounting plate 26 is positioned so as to contact with an end surface of a second axial end side of the inner sleeve 14. In this manner, the differential carrier is connected to the vehicle body in a vibration damping fashion. In the cylindrical elastic mount assembly constructed as above, a main vibration load is applied between the inner sleeve 14 and the outer sleeve 16 in the axial direction thereof, namely, in an upper-to-lower direction (vertical direction) in each of FIGS. 1 and 2. Hereinafter, a side where the fixing bolt 24 is inserted in the inner hole 22 of the inner sleeve 14 (the upper side in each of FIGS. 1 and 2) will be referred to as an upper side and a side where the mounting plate 26 is positioned (the lower side in each of FIGS. 1 and 2) will be referred to as a lower side, in the state where the differential mount 10 connects the differential carrier and the vehicle body to each other in the vibration damping fashion.

Additionally, the inner sleeve 14 has a thick cylindrical shape, and the outer sleeve 16 has a thin cylindrical shape with a greater diameter and a shorter axial direction length than the inner sleeve 14. Furthermore, at a lower end portion of the outer sleeve 16, there is integrally formed an outer flange 28 protruding radially outwardly with a predetermined length and extending continuously along an entire periphery of the outer sleeve.

The main elastic rubber body 18 having a substantially thick cylindrical shape is interposed between the inner sleeve 14 and the outer sleeve 16. The inner sleeve 14 is bonded onto an inner circumferential surface of the main elastic rubber body 18 by vulcanization, and the outer sleeve 16 is bonded onto an outer circumferential surface thereof by vulcanization. Therefore, the differential mount 10 is formed as an integrally vulcanized product by bonding the inner sleeve 14 and the outer sleeve 16, onto the inner and the outer circumferential surfaces of the main elastic rubber body 18, respectively by vulcanization.

In the differential mount 10, a stopper rubber layer 30 is fixedly disposed on a lower surface of the outer flange 28 of the outer sleeve 16, and is integrally formed with the main elastic rubber body 18 so as to substantially cover the entirety of the lower surface of the outer flange. Protrusions 32 having a partially increased height are formed at each of a plurality of locations on a circumference of the stopper rubber layer 30. In the state where the differential carrier is connected to the vehicle body by the differential mount 10 in the vibration damping fashion, the protrusion 32 of the stopper rubber layer 30 is located so as to contact with an upper surface of the mounting plate 26 on the differential carrier side or the vehicle body side, while the rest of the stopper rubber layer 30 except for the protrusions 32 is located opposite to the mounting plate 26 with a vertical predetermined distance therebetween.

In the above structure, in the state where the differential mount 10 connects the differential carrier and the vehicle body in the vibration damping fashion, when a vibration load is applied axially between the inner sleeve 14 and the outer sleeve 16, the main elastic rubber body 18 is subjected to shear-deformation and simultaneously each protrusion 32 of the stopper rubber layer 30 is subjected to elastic compressive deformation. Then, the axial vibration load applied between the inner sleeve 14 and the outer sleeve 16 can be effectively absorbed by a cooperative function between the shear-deformation of the main elastic rubber body 18 and the compressive deformation of the protrusions 32 of the stopper rubber layer 30. Additionally, when a large axial vibration load is applied between the inner and outer sleeves 14, 16 and those sleeves are subjected to excessive relative displacement toward the lower side in the axial direction, the mounting plate 26 abuts against a portion other than the protrusions 32 of the stopper rubber layer 30 to prevent the excessive displacement of the inner and outer sleeves 14, 16. Thereby, the amount of elastic deformation of the main elastic rubber body 18 is limited and any fracture or damage thereof may be obviated.

Then, in the cylindrical elastic mount assembly according to the present embodiment, there is assembled the discrete stopper 12 onto a top end of the differential mount 10 described as above, whose structural features have not been provided in the conventional elastic mount assembly.

Figure 3:
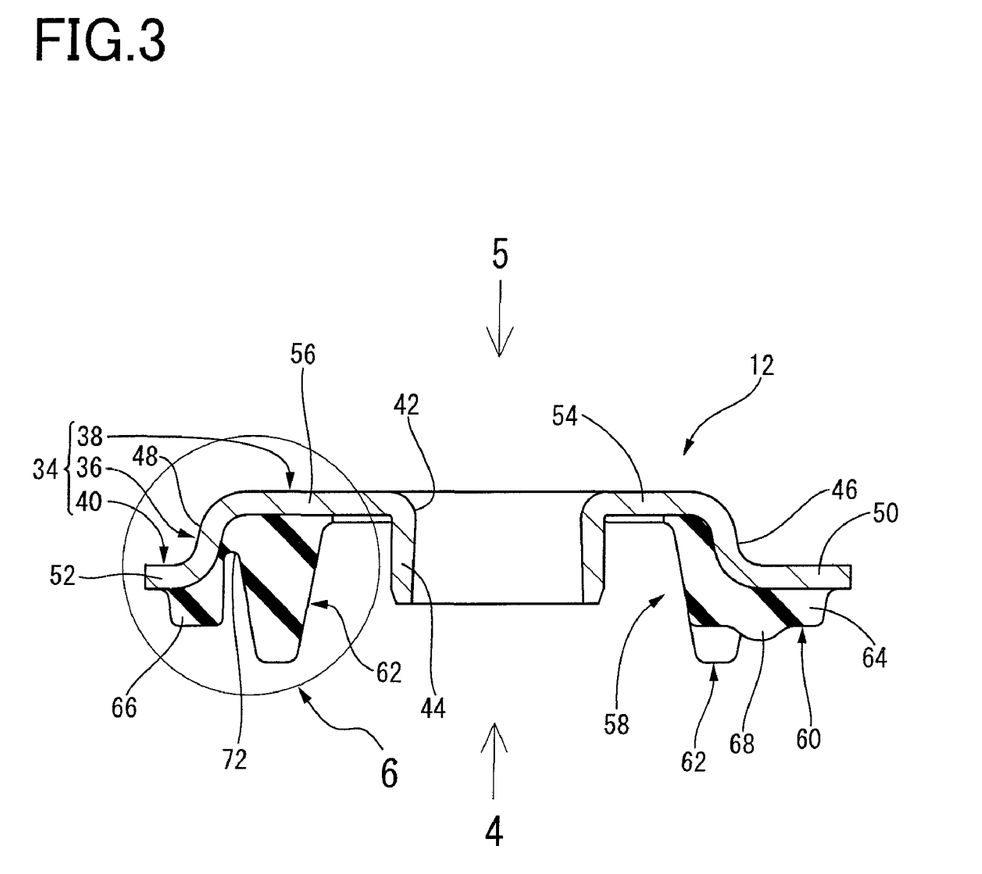
FIG. 3 is an elevational view in axial cross section taken along line 3-3 of FIG. 4, showing a stopper for a cylindrical elastic mount constituting the cylindrical elastic mount assembly shown in FIG. 1.
Figure 4:
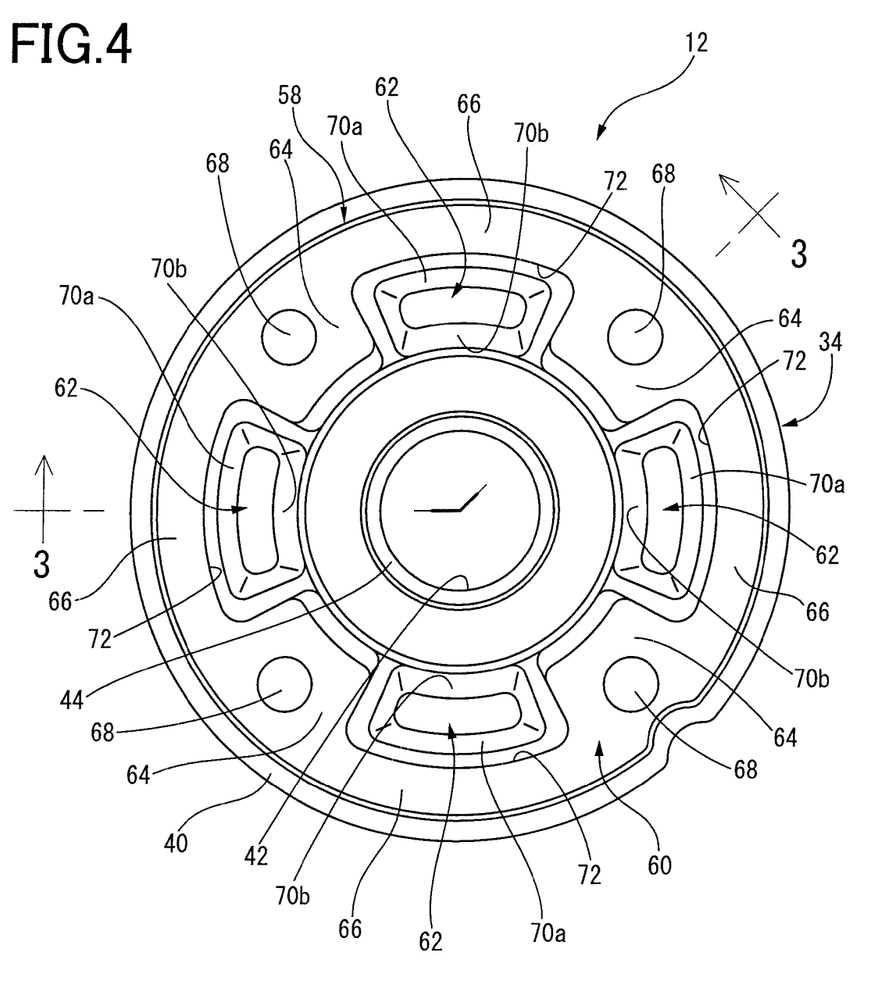
FIG. 4 is an illustration viewed from the direction of arrow 4 in FIG. 3.
Figure 5:
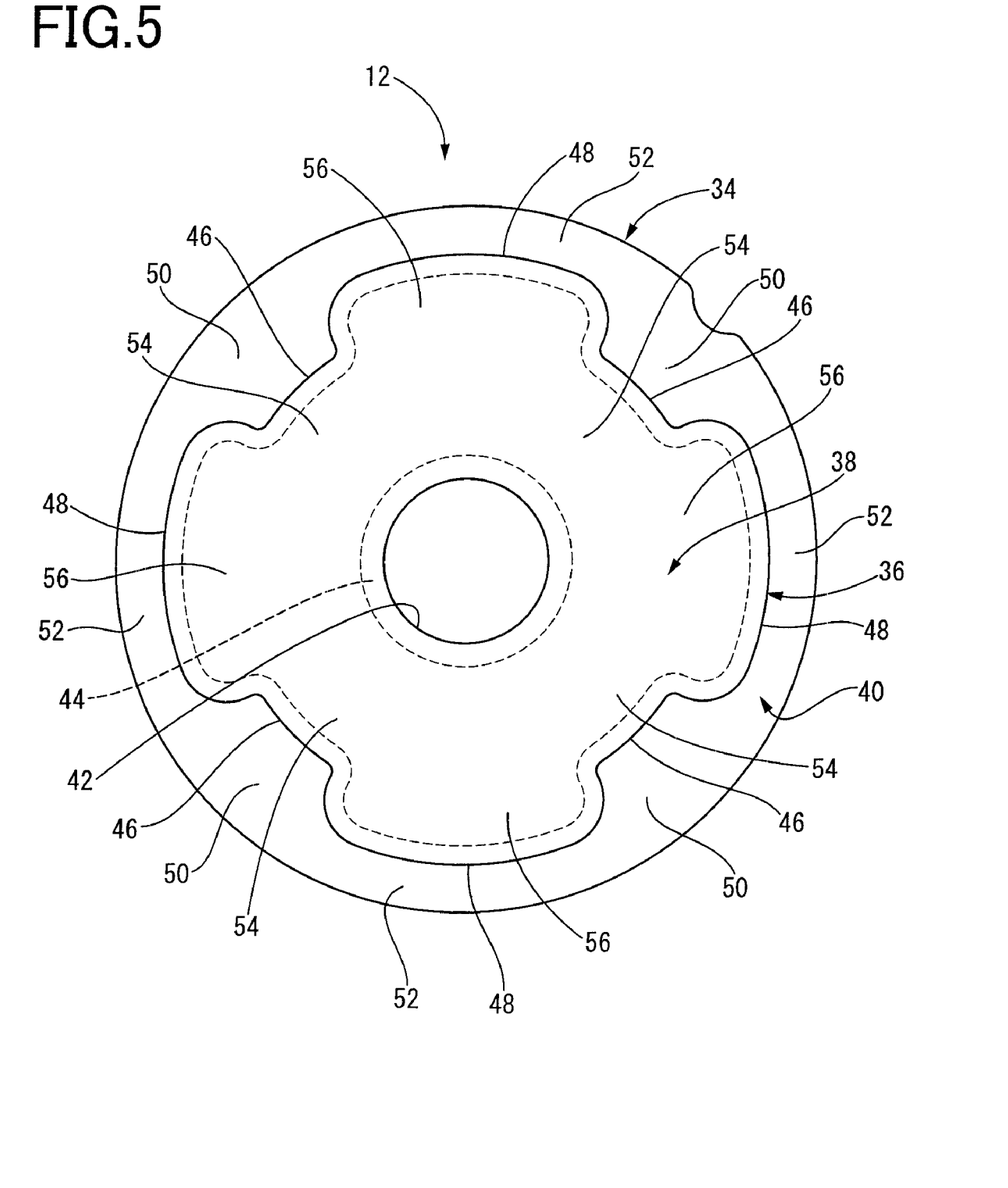
FIG. 5 is an illustration viewed from the direction of arrow 5 in FIG. 3.

More specifically, the discrete stopper 12 has a stopper fitting 34. As shown in FIGS. 3 to 5, the stopper fitting 34 entirely has a round-cylindrical shape with a small height, a substantially large thickness, and a bottom on one side thereof. In addition, the stopper fitting 34 is constructed by integrally including a cylindrical portion 36, a bottom portion 38 that closes an opening at one end side in the axial direction of the cylindrical portion 36 and an outward flange 40 disposed peripherally on the outer circumferential surface of the cylindrical portion on the opposite side of the bottom portion 38. The stopper fitting 34 structured as above can be easily obtained by carrying out a known press molding or the like to a single thick metal disk.

A center hole 42 having a round shape is formed in the center of the bottom portion 38 of the stopper fitting 34, which penetrates therethrough with size capable of inserting the fixing bolt 24 to be inserted in the inner hole 22 of the inner sleeve 14 of the differential mount 10. Furthermore, a cylindrical inner mounting portion 44 is integrally formed uprightly along a periphery of the opening of the center hole 42 which extends coaxially toward the opening side of the cylindrical portion 36 so as to be radially inwardly spaced apart from the cylindrical portion 36. An outer diameter of the cylindrical inner mounting portion 44 is equal to or slightly greater than an inner diameter of the inner sleeve 14 of the differential mount 10. That is, the cylindrical inner mounting portion 44 has the outer diameter capable of being press-fitted into the inner hole 22 of the inner sleeve 14.

The cylindrical portion 36 has a substantially round cylindrical shape having a height lower than that of the cylindrical inner mounting portion 44 formed on the bottom portion 38. In the cylindrical portion 36, there are formed four concave portions 46, each of which is radially inwardly concaved with a depth not reaching the cylindrical inner mounting portion 44, at equal intervals in the circumferential direction of the cylindrical portion 36. Thereby, in the cylindrical portion 36, four portions located between the concave portions 46 adjacent to each other in the circumferential direction are formed as convex portions 48 protruding outwardly in a radial direction. In other words, in this case, the cylindrical portion 36 has a shape like flower petals as a whole in which the four concave portions 46 concave radially inwardly and the four convex portions 48 protruding radially outwardly are arranged alternately to each other in the circumferential direction. In the present embodiment, the length of the circumferential direction of each of the convex portion 48 is made longer by a predetermined length than that of each of the concave portion 46.

In the stopper fitting 34 having the above cylindrical portion 36, on the outward flange 40 which is integrally formed along the periphery of the cylindrical portion 36, there are four portions radially corresponding to the four concave portions 46 of the cylindrical portion 36. They are referred to as enlarged width portions 50 where a radial width of each thereof is increased by the corresponding depth of each concave portion 46 and thereby an end surface of the opening side of the cylindrical portion 36 has an increased area. In addition, on the outward flange 40, there are four portions radially corresponding to the four convex portions 48 of the cylindrical portion 36. Those are, namely, the four portions remaining after excluding the four enlarged width portions 50 and are referred to as reduced width portions 52, each of which has a reduced area at the end surface of the opening side of the cylindrical portion 36 with a reduced radial width by a predetermined length as compared to that of each enlarged width portion 50.

In the above stopper fitting 34, on the bottom portion 38, there are four portions radially corresponding to the four concave portions 46 of the cylindrical portion 36. Those are small diameter portions 54, each of which has a small inside surface area with a diameter reduced by the corresponding depth of each concave portion 46. In addition, on the bottom portion 38 thereof, there are portions radially corresponding to the four convex portions 48 of the cylindrical portion 36. They are, namely, the four portions remaining after excluding the four small diameter portions 54 and are referred to as large diameter portions 56, each of which has a large inside surface area with a diameter larger than that of each small diameter portion 54.

In the present embodiment, of the end surfaces of the stopper fitting 34 structured as above, a stopper rubber 58 is fixedly disposed on the end surface of the opening side of the cylindrical portion 36. The stopper rubber 58 includes a first rubber portion 60 and a plurality of second rubber portions 62. Specifically, in this case, the discrete stopper 12 is constructed as an integrally vulcanized product, in which the stopper fitting 34 is bonded by vulcanization to the stopper rubber 58 produced by integrally forming the first rubber portion 60 and each of the plurality of second portions 62.

More specifically, the first rubber portion 60 of the stopper rubber 58 has a substantially thick, ringed shape, which is substantially corresponding to the outward flange 40 of the stopper fitting 34. A tip surface of the first rubber portion 60 which is located on the side opposite to a side where the first rubber portion is fixedly disposed on the stopper fitting 34 is formed as a flat surface extending perpendicularly to the axial direction of the stopper fitting 34, so that the first rubber portion 60 has a rectangular or trapezoid shape in an axial cross section. Additionally, the first rubber portion 60 having the shape as described above is fixedly disposed on the end surface of the outward flange 40 on the opening-side of the cylindrical portion 36 of the stopper fitting 34, namely, on each end surface of the four enlarged width portions 50 and each end surface of the four reduced width portions 52 provided in the outward flange 40, so as to substantially entirely cover each end surface thereof or so as to protrude with a relatively low height in the direction of the opening of the cylindrical portion 36 on the substantially entire surface of the opening-side end surface thereof.

In the above first rubber portion 60, four portions fixedly disposed on the four enlarged width portions 50 of the outward flange 40 are referred to as large width portions 64, each of which has a large radial width and a tip surface (a surface opposite to the outward flange 40 side) having a sufficiently large area. Meanwhile, four portions remaining after excluding the four large width portions 64, which are fixedly disposed on the four reduced width portions 52 of the outward flange 40, are referred to as small width portions 66, each of which has a small radial width and a tip surface area smaller than that of the large width portion 64. In other words, the first rubber portion 60 having a ring-like shape includes the four large width portions 64 that are positioned at four locations spaced from each other at equal intervals in the circumferential direction and that are fixedly disposed on the enlarged width portions 50 and the four small width portions 66 that are positioned between adjacent those four large width portions 64 in the circumferential direction and that are fixedly disposed on the reduced width portions 52 of the outward flange 40.

Furthermore, in this embodiment, the small width portions 66 of the first rubber portion 60 are fixedly disposed over the end surface of each reduced width portion 52 of the outward flange 40 and a curved surface of the convex portion 48 of the cylindrical portion 36 continuing to the reduced width portion 52. Meanwhile, large width portion 64 is fixedly disposed over the end surface of the enlarged width portion 50 of the outward flange 40, an inside surface of the concave portion 46 of the cylindrical portion 36 continuing to the enlarged width portion 50, and an inside surface of the small diameter portion 54 of the bottom portion 38 continuing to the concave portion 46. Thereby, adjacent ones of the four large width portions 64 in the circumferential direction are arranged so as to sandwich each convex portion 48 of the cylindrical portion 36 of the stopper fitting 34 from both sides in the circumferential direction. Additionally, the radial width and the tip surface area of the large width portion 64 are made sufficiently large as compared to those of the small width portion 66. Furthermore, even when compared to a radial width and a tip surface area of a stopper rubber in the known cylindrical elastic mount where the stopper rubber is fixedly disposed on the outward flange of the discrete stopper, the large width portion 64 has the sufficiently large radial width and tip surface area. In FIGS. 1, 3 and 4, a reference numeral 68 denotes a buffer protrusion for buffering an impact caused when the large width portion 64 of the first rubber portion 60 is brought into contact with the cylindrical fixing portion 20 as will be described below.

Each of the plurality of second portions 62 has a truncated square pyramidal shape as a whole. The each of the plurality of second portions is fixedly disposed on an outer circumferential portion of the inside surface of each of the four large diameter portions 56, which is on the bottom portion 38 on the opening-side end surface of the cylindrical portion 36 of the stopper fitting 34, and is protruding in the direction of the opening of the cylindrical portion 36. In other words, each of the four second rubber portions 62 is in the form of a projection with a flat tip surface, in which a cross-sectional area thereof (a sectional area thereof which is taken along perpendicular to an axial direction) gradually decreases as it approaches a tip thereof. On the inside surface of the bottom portion 38, each of the plurality of second portions 62 is fixedly disposed so as to be integrally provided uprightly on only the inside portion of the convex portion 48 located between adjacent ones in the circumferential direction of the concave portion 46 of the cylindrical portion 36.

Thereby, on the foregoing end surface of the stopper fitting 34, each of the four second rubber portions 62 is located at radially inward of the formation region of each small width portion 66 of the first rubber portion 60 and at the same time between adjacent ones in the circumferential direction of the large width portions 64. Additionally, each second of the rubber portions 62 is fixedly disposed on the stopper fitting 34 with a sufficiently large radial width (thickness) in a state where each second rubber portion is surrounded by the first rubber portion 60 from three directions, namely, from both sides thereof in the circumferential direction and from the outer circumferential side thereof and also is located adjacent to each large width portion 64 of the first rubber portion 60 in the circumferential direction so as to be arranged alternately one by one.

Between each of the second rubber portions 62 and the first rubber portion 60 surrounding the three sides thereof, namely, the both sides in the circumferential direction and the outer circumferential side thereof, there is formed a recessed portion 72 with a narrow groove-like shape, which continuously extends along a circumference of each of the plurality of second portions 62 excluding the inner circumferential side. Thereby, the recessed portion 72 separates each of the plurality of second portions 62 and the first rubber portion 60 surrounding the three sides thereof, whereby each of the plurality of second portions 62 and the first rubber portion 60 (the large width portion 64 and the small width portion 66) are substantially formed so as to exhibit independent elastic deformation function, respectively. As apparent from the description above, in this structure, the recessed portion 72 is made as the groove-shaped gap for separating the first and each of the plurality of second portions.

Figure 6:
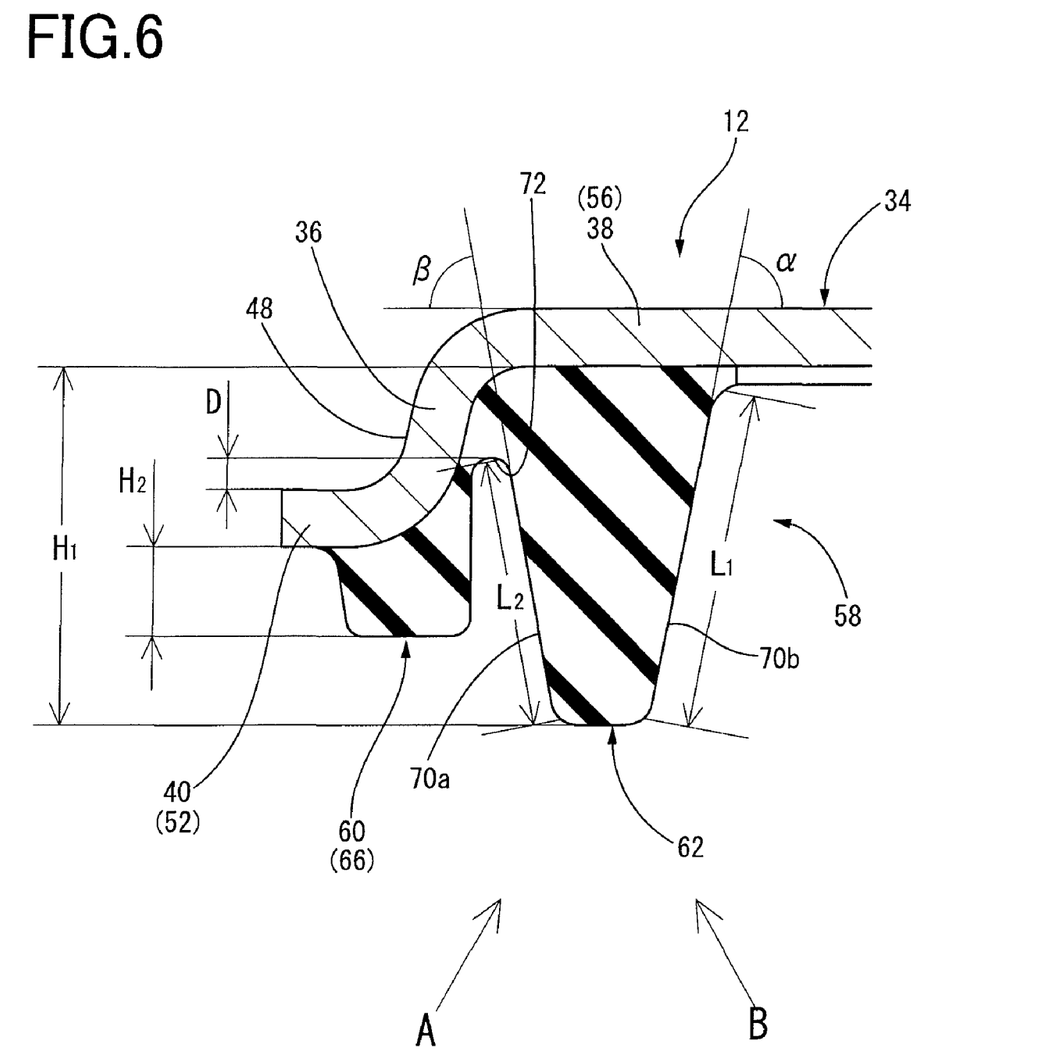
FIG. 6 is a partially enlarged view of circle 6 in FIG. 3.

In the present embodiment, as described above, each of the plurality of second portions 62 is fixedly disposed on the bottom portion 38 of the stopper fitting 34, whereas the first rubber portion 60 (the large width portion 64 and the small width portion 66) is fixedly disposed on the outward flange 40 integrally formed at the opening-side end portion of the cylindrical portion 36. Furthermore, as shown in FIGS. 3 and 6, the tip surface of each of the plurality of second portions 62 is located more anteriorly in the direction of the opening of the cylindrical portion 36 than the tip surface of the first rubber portion 60. Thereby, a height $H_1$ of each of the plurality of second portions 62 is made sufficiently longer than a height $H_2$ of the first rubber portion 60.

A depth of the recessed portion 72 formed between each of the plurality of second portions 62 and the first rubber portion 60 is formed into such a depth that a bottom surface of the recessed portion 72 is located on a side of the bottom portion 38 side by a predetermined size (a size indicated by D in FIG. 6), rather than on a side of an opposite side of a surface where the first rubber portion 60 is disposed on the outward flange 40 of the stopper fitting 34. Thereby, when a vibration load is applied axially to the discrete stopper 12 in the state where the stopper is assembled to the differential mount 10 as will be described below, each of the plurality of second portions 62 having the sufficiently large height $H_1$ can be subjected to compressive deformation with a relatively large portion thereof, namely, with a sufficiently large amount of rubber.

The formation in which the bottom surface of the recessed portion 72 is located as described above can be realized by employing the structure according to the present invention. In the structure, each of the plurality of second portions 62 with the sufficiently large radical width (thickness) is located at inside of the convex portion 48 of the cylindrical portion 36 where the reduced width portion 52 of the outward flange 40 is integrally extended. In other words, the recessed portion 72 with the foregoing depth cannot be formed by the known structure in which the second rubber portion (62) with the sufficiently large radial width (thickness) is disposed on the inside of the cylindrical portion (36) where a relatively large width portion of the outward flange (40) is integrally extended. This is because the employment of the above formation in the known structure extremely reduces the thickness of a rubber portion located between the bottom portion of the recessed portion (72) and the stopper fitting (34). Consequently, this makes it extremely difficult to integrally form the first rubber portions (60) and second rubber portion (62) in the vulcanization and molding operation of the stopper rubber (58).

Furthermore, each of the plurality of second portions 62 has the truncated square pyramidal shape which includes an outer side surface 70a and an inner side surface 70b, which are composed of inclined surfaces inclining so as to become closer to each other as it approaches a tip thereof and are opposed to each other, such that they are located on the outer circumferential side and the inner circumferential side of the bottom portion 38, respectively. In this case, a length $L_1$ of the inner side surface 70b (a minimum distance between a tip portion and a base end of the inner side surface 70b) is made longer than a length $L_2$ of the outer side surface 70a (a minimum distance between a tip portion and a base portion of the outer side surface 70a). Additionally, a gradient α of the inner side surface 70b (an inclination angle of the inner side surface 70a with respect to an axially perpendicular direction of the stopper fitting 34) is made smaller and more gradual than a gradient 3 of the outer side surface 70a (an inclination angle of the outer side surface 70b with respect to an axially perpendicular direction of the stopper fitting 34).

As described above, in the present embodiment, the gradient α of the inner side surface 70b of each of the plurality of second portions 62 is made more gradual than the gradient β of the outer side surface 70a. Thus, in the state where the discrete stopper 12 is assembled to the differential mount 10 as will be described below, when a vibration load is applied to the discrete stopper, for example, in a direction of an arrow A in FIG. 6, that is, in a direction from the outer circumferential side of the discrete stopper 12 to the inner circumferential side thereof, a bracing force against the vibration load can be effectively exhibited at the inner side of each of the plurality of second portions 62. Thereby, each of the plurality of second portions 62 can be prevented from falling inward to the maximum extent possible, so that compressive deformation of each of the plurality of second portions 62 can be ensured. Meanwhile, when a vibration load is applied to the discrete stopper 12, for example, in a direction of an arrow B in FIG. 6, that is, in a direction from the inner circumferential side of the discrete stopper 12 to the outer circumferential side thereof, each of the plurality of second portions 62 is fallen outwardly. At the same time, an extension amount of the inner side of each of the plurality of second portions 62 can be advantageously ensured, since the length $L_1$ of the inner side surface 70b of each of the plurality of second portions 62 is made longer than the length $L_2$ of the outer side surface 70a. As a result, in the discrete stopper 10, any damage or breakage due to the outward falling of each of the plurality of second portions 62 can be prevented to the maximum extent possible.

Then, as shown in FIG. 1, the discrete stopper 12 having the above structure is disposed coaxially onto an upper part of the differential mount 10 such that the center hole 42 of the stopper fitting 34 communicates with the inner hole 22 of the inner sleeve 14 of the differential mount 10. Additionally, the cylindrical inner mounting portion 44 of the stopper fitting 34 is press-fitted into the inner hole 22 of the inner sleeve 14 through an upper opening thereof. Thereby, the discrete stopper 12 is integrally assembled to an upper end portion of the differential mount 10. Thus, the cylindrical elastic mount assembly is obtained by integrally assembling the discrete stopper 12 structured as above to the differential mount 10.

Furthermore, in the discrete stopper 12 assembled to the differential mount 10 described above, in the state where the differential mount 10 connects the vehicle body and the differential carrier in the vibration damping fashion, an inner circumferential portion of the bottom portion 38 of the stopper fitting 34 is sandwiched between an upper end surface of the inner sleeve 14 of the differential mount 10 and a head portion of the fixing bolt 24 for fixing the differential mount 10 to the mounting plate 26, whereby the inner circumferential portion thereof and the differential mount 10 are fixed together to the mounting plate 26. In addition, the cylindrical portion 36 of the stopper fitting 34, in the state that the cylindrical portion is opening toward the lower side where the differential mount 10 is located, is disposed radially outwardly of the inner sleeve 14 of the differential mount 10 with a predetermined distance therebetween. Meanwhile, the outward flange 40 and the bottom portion 38 of the stopper fitting 34 are positioned opposite to an upper end surface of the cylindrical fixing portion 20 with a predetermined distance therebetween. The cylindrical fixing portion 20 is externally fitted and fixed to the outer sleeve 16 of the differential mount 10. Then, of the stopper rubber 58 fixedly disposed onto the outward flange 40 and the bottom portion 38, the first rubber portion 60 with the small height, which is fixedly disposed on the outward flange 40, is entirely positioned opposite to the upper end surface of the cylindrical fixing portion 20 with a predetermined distance therebetween. In addition, the four second rubber portions 62 fixedly disposed on the large diameter portion 56 of the bottom portion 38 are located so as to be in contact with the upper end surface of the cylindrical fixing portion 20.

Thereby, in the state where the cylindrical elastic mount assembly of the present embodiment is interposed between the vehicle body and the differential carrier, when a large vibration load is applied axially between the inner sleeve 14 and the outer sleeve 16 and then the sleeves are relatively displaced excessively toward their axial upper direction side, the first rubber portion 60 of the stopper rubber 58 disposed on the discrete stopper 12 is brought into abutting contact with the upper end surface of the cylindrical fixing portion 20, thereby preventing the excessive displacement of the inner and outer sleeves 14 and 16. Accordingly, an amount of elastic deformation of the main elastic rubber body 18 is limited, thereby advantageously preventing breakage or damage of the elastic body.

Particularly, in the cylindrical elastic mount assembly described above, the first rubber portion 60 of the stopper rubber 58 includes the four large width portions 64 having more sufficiently large radial width and tip surface area as compared to those of the stopper rubber in the known discrete stopper. Therefore, when the inner sleeve 14 and the outer sleeve 16 are subjected to excessive relative displacement toward the upper direction side, the first rubber portion 60 is brought into contact with the upper end surface of the cylindrical fixing portion 20 with a larger contacting area thereof. Thereby, when the first rubber portion 60 is brought into contact with the cylindrical fixing portion 20, an impact load applied to the first rubber portion 60 from the cylindrical fixing portion 20 is advantageously dispersed, thereby the amount of compressive deformation occurring in the first rubber portion 60 can effectively reduced. As a result, durability of the first rubber portion 60 can be advantageously improved.

In the state where the cylindrical elastic mount assembly according to the present embodiment is interposed between the vehicle body and the differential carrier, when an axial vibration load is applied between the inner sleeve 14 and the outer sleeve 16, the four second rubber portions 62 of the discrete stopper 12 are brought into contact with and pressed against the cylindrical fixing portion 20 so as to be subjected to elastically compressive deformation until the upper end surface of the cylindrical fixing portion 20 abuts against the first rubber portion 60 of the discrete stopper 12. Then, the axial vibration load can be effectively absorbed owing to the cooperation among the compressive deformation function of each of second rubber portions 62, the shear-deformation function of the main elastic rubber body 18 of the differential mount 10 described above, and the compressive deformation function of the protrusions 32 of the stopper rubber layer 30 formed integrally with the main elastic rubber body 18.

Particularly in this embodiment, since each of the plurality of second portions 62 has the sufficiently large radial width (thickness) and height, a spring constant of each of the plurality of second portions 62 can be advantageously reduced. Accordingly, when each of the plurality of second portions 62 contacts with the cylindrical fixing portion 20 and is compressively deformed, soft spring characteristics thereof can be exhibited and the amount of compressive deformation thereof can be effectively reduced. Thereby, the durability of each of the plurality of second portions 62 can be advantageously improved.

Therefore, the cylindrical elastic mount assembly according to the present embodiment has the excellent durability and the sufficiently high performance or characteristics. Thus, the assembly can highly stably and reliably exhibit the stopper function for limiting the amount of the axial relative displacement between the inner sleeve 14 and the outer sleeve 16 of the differential mount 10 and the vibration damping function for absorbing the axial vibration load applied between the inner and outer sleeve 14 and 16.

Additionally, in the above cylindrical elastic mount assembly, the large width portions 64 of the first rubber portion 60 and each of the plurality of second portions 62 are arranged so as to be adjacent in the circumferential direction and arranged alternately to each other on the stopper fitting 34. Furthermore, the large width portions 64 and each of the plurality of second portions 62, respectively, are located at equal intervals in the circumferential direction. Thereby, the stopper function for limiting the amount of the axial relative displacement between the inner sleeve 14 and the outer sleeve 16, as well as the vibration damping function for absorbing the axial vibration load applied therebetween can be stably exhibited with a better balance, in which no variation of the functions are observed in the circumferential direction of the discrete stopper 12.

Moreover, in the present embodiment, each of the plurality of second portions 62 is formed into the truncated square pyramidal shape, which is in the form of a projection where the cross-sectional area thereof is gradually decreased as it approaches the tip thereof. Therefore, when an axial vibration load is applied between the inner sleeve 14 and the outer sleeve 16, each of the plurality of second portions 62 can be more reliably compressed and deformed without being fallen down. As a result, the vibration damping function, which absorbs the vibration load, can be exhibited more stably.

In the cylindrical elastic mount assembly described above, the recessed portion 72 formed between the first rubber portion 60 and each of the plurality of second portions 62 has the sufficient depth in which the bottom surface thereof is located on a side of the bottom portion 38, rather than on the side of surface opposite to the surface where the first rubber portion 60 is formed on the outward flange 40 of the stopper fitting 34. Thereby, the height $H_1$ of each of the plurality of second portions 62 is made sufficiently large. Accordingly, when the axial vibration load is applied between the inner sleeve 14 and the outer sleeve 16, each of the plurality of second portions 62 can be compressively deformed with a sufficient amount of rubber. In this manner, similarly, the vibration damping function can be exhibited more effectively and reliably to absorb the vibration load.

In the present embodiment, the gradient α of the inner side surface 70b of each of the plurality of second portions 62 is made more gradual than the gradient β of the outer side surface 70a thereof. Thus, even when a vibration load is applied in the direction from the outer circumferential side of the discrete stopper 12 to the inner circumferential side thereof, each of the plurality of second portions 62 can be prevented from falling inward to the maximum extent possible so as to ensure the compressive deformation of each of the plurality of second portions 62. Accordingly, the vibration damping function, which absorbs the vibration load, can be exhibited more effectively and stably.

In the cylindrical elastic mount assembly according to the present embodiment, when each of the plurality of second portions 62 is fallen outwardly, the extension amount of the inner side of each of the plurality of second portions 62 can be advantageously ensured, since the length $L_1$ of the inner side surface 70b of each of the plurality of second portions 62 is made longer than the length $L_2$ of the outer side surface 70a. As a result, in the discrete stopper 10, any damage or breakage due to the outward falling of each of the plurality of second portions 62 can be prevented to the maximum extent possible. Accordingly, the foregoing vibration damping function can be effectively exhibited with more sufficient durability.

Furthermore, in the cylindrical elastic mount assembly described above, the first rubber portion 60 and each of the plurality of second portions 62 are fixedly and integrally disposed on the stopper fitting 34. Accordingly, as compared to the structure in which the first rubber portion 60 and the second rubber portion 62 are independently formed as discrete members to be fixedly disposed on the stopper fitting 34, there is an advantage in manufacturing efficiency of the stopper rubber 58 including those rubber portions, and consequently, there is an advantage in manufacturing efficiency of the entire discrete stopper 12.

Furthermore, in the present embodiment, the discrete stopper 12 is integrally assembled to the differential mount 10 by press-fitting the cylindrical inner mounting portion 44 integrally formed on the bottom portion 38 of the stopper fitting 34 into the inner sleeve 14 of the differential mount 10. Accordingly, for example, unlike the structure in which the cylindrical inner mounting portion 44 is externally fitted and fixedly disposed to the inner sleeve 14, the embodiment can advantageously secure the formation region of the plurality of second rubber portions 62 within the limited space of the bottom portion 38. Thereby, it is also possible to advantageously secure the sufficient radial width of each of the plurality of second portions 62.

While the preferred embodiment of the present invention has been described in detail, for illustrative purpose only, it is to be understood that the present invention is not limited to the details of the illustrated embodiment.

For example, the numbers, the locations, the shapes and the dimensions of the large width portions 64 of the first rubber portion 60 and the second rubber portion 62 are not limited to those of the illustrated embodiment, and may be suitably determined depending upon the dimension of the discrete stopper 12, the vibration damping performance and the like required for the cylindrical elastic mount assembly.

In addition, obviously, the numbers, the locations, the shapes, the dimensions and the like of the concave portion and the convex portion 48 provided at the cylindrical portion 36 of the stopper fitting 34 are determined in accordance with those required for the large width portions 64 of the first rubber portion 60 and the second rubber portion 62.

The first rubber portion 60 and the second rubber portion 62 may be formed independently as discrete members.

Additionally, it is also obvious that the structure for assembling the stopper for a cylindrical elastic mount in the form of the discrete stopper 12 to a cylindrical elastic mount in the form of the differential mount 10 and the structure for fixing the cylindrical elastic mount to a fixing member of a vehicle body side or a differential carrier side are not particularly limited to those described in the above embodiment. For example, in the state where the cylindrical elastic mount is interposed between the vehicle body and the differential carrier, the discrete stopper 12 may be assembled to the differential mount 10 such that each of the plurality of second portions 62 is not in contact with the upper end surface of the cylindrical fixing portion 20.

While the stopper for a cylindrical elastic mount assembled to a differential mount for automobile and the cylindrical elastic mount assembly constructed by assembling the differential mount and the stopper for a cylindrical elastic mount has been described as the preferred embodiment of the invention, however, the principle of the invention is equally applicable to a stopper for a cylindrical elastic mount assembled to a cylindrical elastic mount such as a member mount or body mount for an automobile or a cylindrical elastic mount for something other than an automobile, as well as any cylindrical elastic mount assembly constructed by assembling the cylindrical elastic mount for an automobile or something other than an automobile and the stopper for a cylindrical elastic mount.

It is to be understood that the present invention may be embodied with various other changes and modifications which may occur to those skilled in the art, without departing from the spirit and scope of the invention.

What is claimed is:

1. A stopper for a cylindrical elastic mount assembled to a first axial end of the cylindrical elastic mount including a shaft member fixed to a first member, an outer cylindrical member that is fixed to a second member connected to the first member in a vibration damping fashion and that is disposed radially outwardly of the shaft member with a predetermined radial distance therebetween, and a main elastic rubber body interposed between the shaft member and the outer cylindrical member for elastic connection therebetween, the stopper comprising:

a stopper fitting with a cylindrical shape having a bottom on one side thereof and opening toward a second axial end of the cylindrical elastic mount in the state of being assembled thereto, the stopper fitting having a cylindrical portion disposed radially outwardly of the shaft member with a predetermined radial distance therebetween; an outward flange formed integrally along a periphery of an opening-side end of the cylindrical portion; and a bottom portion supported by the shaft member;

a first rubber portion fixedly disposed on the outward flange of the stopper fitting and protruding toward the opening of the cylindrical portion of the stopper fitting, the first rubber portion being brought into contact with the outer cylindrical member or the second member to which the outer cylindrical member is fixed, so as to limit an amount of an axial relative displacement between the outer cylindrical member and the shaft member; and a plurality of second rubber portions fixedly disposed on the bottom portion of the stopper fitting and protruding higher than the first rubber portion toward the opening of the cylindrical portion, each of the plurality of second portions being elastically deformed so as to allow the axial relative displacement between the outer cylindrical member and the shaft member until the outer cylindrical member or the second member is abutted against the first rubber portion in a state where each of the plurality of second portions is in contact with the outer cylindrical member or the second member, wherein a concave portion is formed at each of a plurality of locations on a circumference of the cylindrical portion of the stopper fitting, the concave portion being concaved in a radially inward direction to partially enlarge a width of the outward flange so as to provide a large width portion on the enlarged width portion of the outward flange of the first rubber portion, while each of the plurality of second portions is fixedly disposed only between adjacent concave portions in a circumferential direction of the bottom portion, and wherein a groove-shaped gap for separating the first and each of the plurality of second portions is provided so as to continuously extend around each of the plurality of second portions.

2. The stopper for cylindrical elastic mount according to claim 1, wherein the large width portion of the first rubber portion and each of the plurality of second portions are fixedly disposed on the stopper fitting so as to be adjacent to each other in a circumferential direction and arranged alternately.

3. The stopper for cylindrical elastic mount according to claim 1, wherein each of the plurality of second portions is in the form of a projection whose cross-sectional area gradually decreases toward a tip thereof.

4. The stopper for cylindrical elastic mount according to claim 3, wherein each of the plurality of second portions comprises an outer side surface and an inner side surface that are positioned opposite to each other on an outer circumferential side and an inner circumferential side, respectively, of the bottom portion of the stopper fitting, the outer and inner side surfaces being formed of inclined surfaces inclining so as to be closer to each other as it approaches the tip of each of the plurality of second portions, and the inner side surface having a longer length and more gradual inclination than that of the outer side surface.

5. The stopper for cylindrical elastic mount according to claim 1, wherein the first and each of the plurality of second portions are fixedly and integrally disposed on the stopper fitting.

6. The stopper for cylindrical elastic mount according to claim 5, wherein the groove-shaped gap comprises a recessed portion extending with a predetermined depth between the first and each of the plurality of second portions in a height direction thereof, the recessed portion having a bottom surface located on a side of the bottom portion of the stopper fitting, rather than on a side of an opposite side of a surface where the first rubber portion is formed on the outward flange of the stopper fitting.

7. The stopper for cylindrical elastic mount according to claim 1, wherein the stopper fitting has a through hole in the center of the bottom portion thereof, and a cylindrical mounting inner portion which extends toward the opening of the cylindrical portion and which is integrally provided uprightly along a periphery of an opening of the through hole, the cylindrical mounting inner portion is press-fitted into an inner hole formed in the shaft member of the cylindrical elastic mount, whereby the bottom portion of the stopper fitting is supported by the shaft member.

8. The stopper for cylindrical elastic mount according to claim 1, wherein the concave portion is formed at four locations at equal intervals in the circumferential direction of the cylindrical portion.

9. The stopper for cylindrical elastic mount according to claim 8, wherein the length of the circumferential direction of each of the convex portions is made longer by a predetermined length than that of each of the concave portions.

10. The stopper for cylindrical elastic mount according to claim 1, further comprising a buffer protrusion which is disposed between any adjacent two of the plurality of second rubber portions.

11. A cylindrical elastic mount constructed by assembling a stopper for cylindrical elastic mount to a first axial end of a cylindrical elastic mount including a shaft member fixed to a first member, an outer cylindrical member that is fixed to a second member connected to the first member in a vibration damping fashion and that is disposed radially outwardly of the shaft member with a predetermined radial distance therebetween, and a main elastic rubber body interposed between the shaft member and the outer cylindrical member for elastic connection therebetween, wherein the stopper for cylindrical elastic mount is the stopper for cylindrical elastic mount according to claim 7.

* * * * *